(12) United States Patent
Fisher et al.

(10) Patent No.: US 6,226,711 B1
(45) Date of Patent: May 1, 2001

(54) METHOD, APPARATUS AND FRAME FORMAT TO PREVENT DATA LOSS IN A REMOVABLE MEDIA LIBRARY SYSTEM DUE TO INCORRECT CONFIGURATION OF DEVICES

(75) Inventors: James Arthur Fisher, Tucson; Gregory Tad Kishi, Oro Valley; Jonathan Wayne Peake, Tucson, all of AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/094,054

(22) Filed: Jun. 9, 1998

(51) Int. Cl.[7] ............................ G06F 12/00; G06F 12/14; G06F 11/00; H03M 13/03; H02H 3/05
(52) U.S. Cl. .......................... 711/111; 711/112; 711/113; 711/114; 714/769; 714/799; 714/771; 714/770; 714/48; 714/1
(58) Field of Search ...................................... 711/114, 112, 711/113, 111, 117; 714/7, 48, 769, 100, 2, 3, 770, 771, 799

(56) References Cited

U.S. PATENT DOCUMENTS

| | | |
|---|---|---|
| 4,773,005 | 9/1988 | Sullivan . |
| 5,363,487 | 11/1994 | Willman et al. . |
| 5,416,914 | * 5/1995 | Korngiebel et al. ................. 395/425 |
| 5,559,982 | * 9/1996 | Wideman ............................. 395/428 |
| 6,006,308 | * 12/1999 | Matsunami et al. ................. 711/114 |

FOREIGN PATENT DOCUMENTS 61-62921   3/1986   (JP) .

* cited by examiner

*Primary Examiner*—Do Yoo
*Assistant Examiner*—Kimberly McLean
(74) *Attorney, Agent, or Firm*—Altera Law Group, LLC (57) ABSTRACT

A method, apparatus and frame format for allowing the conclusive determination of whether the devices are connected correctly is disclosed. The invention sends a first configuration message to a library manager from a device, the first configuration message including a device address and a serial number associated with the device address, forwards to a control unit from a library manager a second configuration message, the second configuration message including position information for the device and a serial number associated with the device, forwards to the control unit from the device a third configuration message, the third configuration message including position information for the device and a serial number associated with the device and compares at the control unit the second and third configuration messages to determine whether the device and the library manager are configured correctly. The configuration message may include a plurality of device addresses and a serial number associated with each of the plurality of device address. The controller compares the second and third configuration messages by comparing the serial number of each of the device addresses in the second configuration message with the serial number associated with corresponding positions in the third configuration message. The second and third configuration messages further include partition information associated with the device.

20 Claims, 5 Drawing Sheets

METHOD, APPARATUS AND FRAME FORMAT TO PREVENT DATA LOSS IN A REMOVABLE MEDIA LIBRARY SYSTEM DUE TO INCORRECT CONFIGURATION OF DEVICES

BACKGROUND OF THE INVENTION

1. Field of the Invention

This invention relates in general to data storage and processing, and more particularly to a method, apparatus and frame format to prevent data loss in a removable media library system due to incorrect configuration of devices.

2. Description of Related Art

The implementation of new technology in magnetic storage products has meant that the density of data written to magnetic storage media has increased by orders of magnitude in the last ten or fifteen years. The ability to record high density media, e.g., ten gigabytes or more on one physical volume, has led to reducing costs in physical hardware as well as in handling and management resources.

Nevertheless, certain problems still remain with this relatively new technology. For example, under certain conditions, data can become lost due to incorrect configuration of the devices. In a Removable Media Library (RML), hosts request the mounting of volumes on devices. However, if the devices are configured incorrectly, the library will mount the wrong volume serial numbered cartridge on the device. This means that the host will write data on the wrong physical volume. This causes the data to become lost because the next time the host requests the volume, it will request the one it thought it had written data to, not the one that was actually mounted.

For example, a host requests the RML to mount volume 1 on device A, and to mount volume 2 on device B. The RML uses the external label to mount the volumes on the requested devices and the RML successfully mounts the volumes as requested. However, due to an incorrect configuration, the RML thinks device A is device B and visa versa. The host writes the internal label on each volume, but because of the configuration problem, volume 1 now has an internal label of 2 and volume 2 has an internal label of 1. Thus, the data written by the host is put onto the wrong volumes. Subsequently, the volumes are dismounted. Later when the host asks for Volume 1 to be mounted again, the RML mounts the volume with external label 1 but with an internal label of 2. The data intended for Volume 1 is now lost.

A specific example of an RML is a virtual tape server (VTS). In a VTS, the hardware is transparent to the host and the user, and the VTS requires little external management except through the library management element of the tape library into which a VTS is integrated.

In hierarchical storage systems, such as a VTS, intensively used and frequently accessed data is stored in fast but expensive memory. One example of a fast memory is a direct access storage device (DASD). In contrast, less frequently accessed data is stored in less expensive but slower memory. Examples of slower memory are tape drives. The goal of the hierarchy is to obtain moderately priced, high-capacity storage while maintaining high-speed access to the stored information.

In the VTS system, a host data interface, a DASD file buffer, and a number of tape devices are provided. When the host writes a logical volume, or a file, to the VTS, the data is stored as a resident file on the DASD. Although the DASD provides quick access to this data, it will eventually reach full capacity and a backup or secondary storage system will be needed. An IBM 3590 tape cartridge is one example of a tape device that could be used as a backup or secondary storage system.

When the DASD fills to a predetermined threshold, the logical volume data for a selected logical volume, typically the least recently accessed by the host, is removed from the DASD to free space for more logical volumes. The selected DASD file is then appended onto a tape cartridge, or a physical volume, with the original left on the DASD for possible cache hits. When a DASD file has been appended to a tape cartridge and the original remains on the DASD, the file is "premigrated".

When the host reads a logical volume from the VTS, a cache hit occurs if the logical volume currently resides on the DASD. If the logical volume is not on the DASD, the storage manager determines which of the physical tape volumes contains the logical volume. The corresponding physical volume is then mounted on one of the tape devices, and the data for the logical volume is transferred back to the DASD from the tape (recall).

Tape servers may use an engine to move data between the DASD and tape drives in a virtual tape server (VTS) environment. For example, the IBM Virtual Tape Server (VTS) uses the IBM Adstar Distributed Storage Manager (ADSM) as its engine to move data between the DASD and IBM 3590 tape drives on the VTS. In such a system, the VTS uses the storage manager client on the DASD, e.g., the ADSM Hierarchical Storage Manager (HSM) client, and a distributed storage manager server attached to the tape drives to provide this function.

Within a Virtual Tape Server (VTS) like system, the consequences of a mis-configured set of devices is compounded since a single physical volume contains multiple logical volumes (100+). Each physical volume whose internal label does not match the external label results in multiple logical volumes becoming lost and a great impact to a customer. In a VTS, it is the responsibility of the VTS to ensure that the devices are configured correctly since it is the host system for the physical devices.

It can be seen then that there is a need for a method to determine if the devices are mis-configured and to prevent the use of the mis-configured devices.

SUMMARY OF THE INVENTION

To overcome the limitations in the prior art described above, and to overcome other limitations that will become apparent upon reading and understanding the present specification, the present invention discloses a method, apparatus and frame format for allowing the conclusive determination of whether the drives are configured or connected correctly.

The present invention solves the above-described problems by adding physical position and library partition information into the configuration records passed to the control unit so that the control unit can determine precisely if its devices are configured correctly.

A method in accordance with the principles of the present invention includes the steps of sending a first configuration message to a library manager from a drive, the first configuration message including a drive address and a serial number associated with the drive address, forwarding to a control unit from a library manager a second configuration message, the second configuration message including position information for the drive and a serial number associated with the drive, forwarding to the control unit from the drive a third configuration message, the third configuration message including position information for the drive and a serial number associated with the drive and comparing at the control unit the second and third configuration messages to determine whether the drive and the library manager are configured correctly.

Other embodiments of a system in accordance with the principles of the invention may include alternative or optional additional aspects. One such aspect of the present invention is that the first configuration message further includes a plurality of drive addresses and a serial number associated with each of the plurality of drive address, the second configuration message further includes position information for a plurality of drives and a serial number associated with each of the plurality of drives, and the third configuration message further includes position information for a plurality of drives and a serial number associated with each of the plurality of drives.

Another aspect of the present invention is that the step of comparing the second and third configuration messages to determine whether the drive and the library manager are configured correctly further includes the step of comparing the serial number of each of the drive addresses in the second configuration message with the serial number associated with corresponding positions in the third configuration message.

Another aspect of the present invention is that the second and third configuration messages further include partition information associated with the drive.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method, apparatus and frame format that allows the conclusive determination of whether the drives are connected correctly. The present invention prevents data loss due to incorrect configuration of devices by adding physical position and library partition information into the configuration records passed between the library manager and the control unit. Thus, the RML can determine precisely if its devices are configured correctly.

Figure 1:
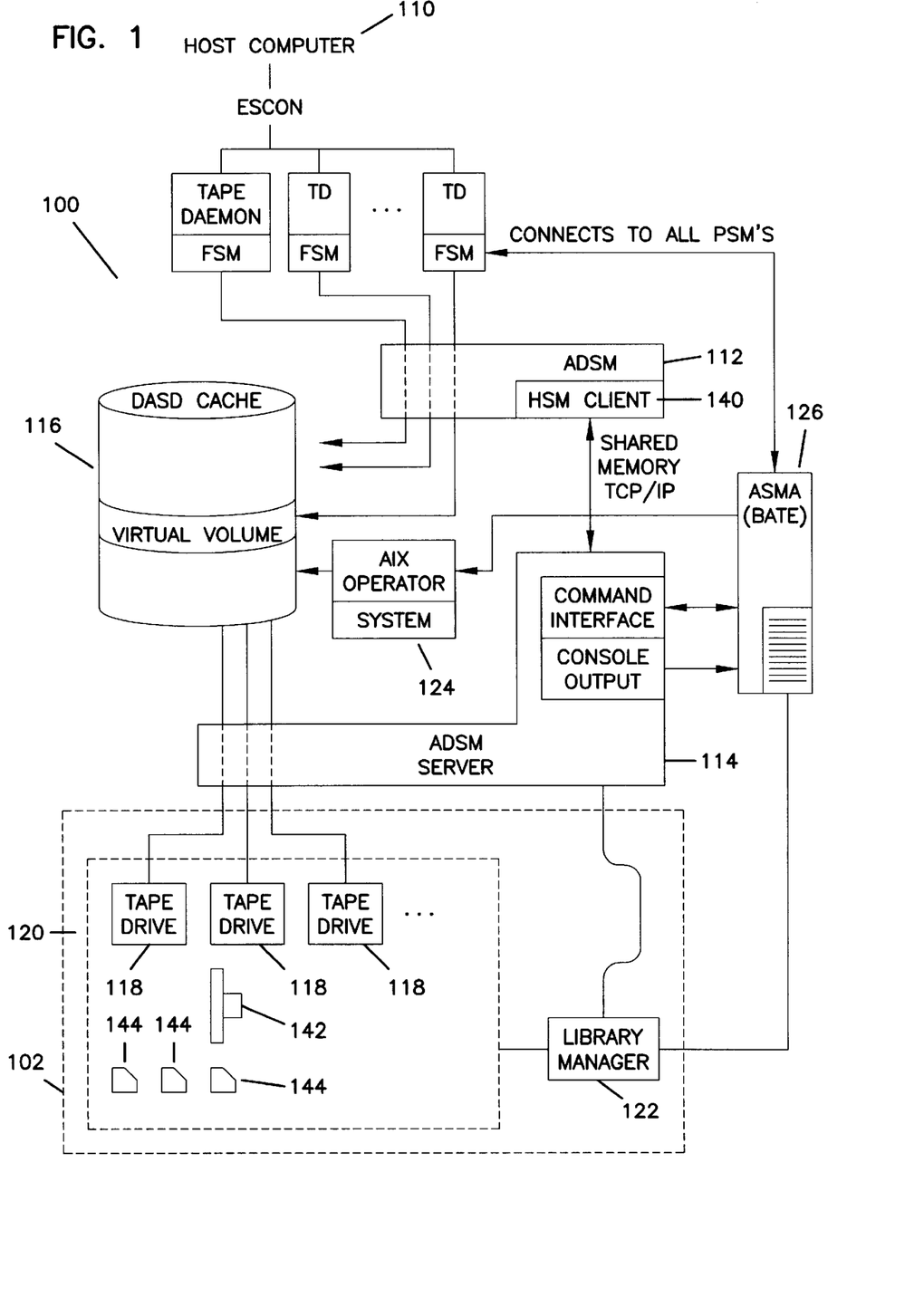
FIG. 1 illustrates a detailed block diagram of a virtual tape server (VTS) system according to the present invention.

FIG. 1 illustrates a detailed block diagram of a virtual tape server (VTS) system 100 according to the present invention. The virtual tape server attaches to a host computer 110, and includes a distributed storage manager client 112, a distributed storage manager server 114, and DASD cache 116. A tape library data server 102 is included and comprises a plurality of tape drives 118 forming an automated library 120, which is controlled by a library manager 122.

In the VTS 100, intensively used and frequently accessed data is stored in fast but expensive memory, such as direct access storage devices (DASD) 116. In contrast, less frequently accessed data is stored in less expensive but slower memory, such as tape cartridges 144.

A VTS 100 uses an engine 114 to move data between the DASD 116 and tape drives 118. For example, the IBM Virtual Tape Server (VTS) uses the IBM Adstar Distributed Storage Manager (ADSM) as its engine to move data between the DASD and IBM 3590 tape drives on the VTS. In such a system, the VTS 100 uses the storage manager 112, e.g., the ADSM Hierarchical Storage Manager (HSM) client 140, and a distributed storage manager server 114 attached to the tape drives 118 to provide this function. The library manager 122, via commands from the distributed storage manager server 114, controls an accessor 142 which accesses individual tapes 144.

Figure 2:
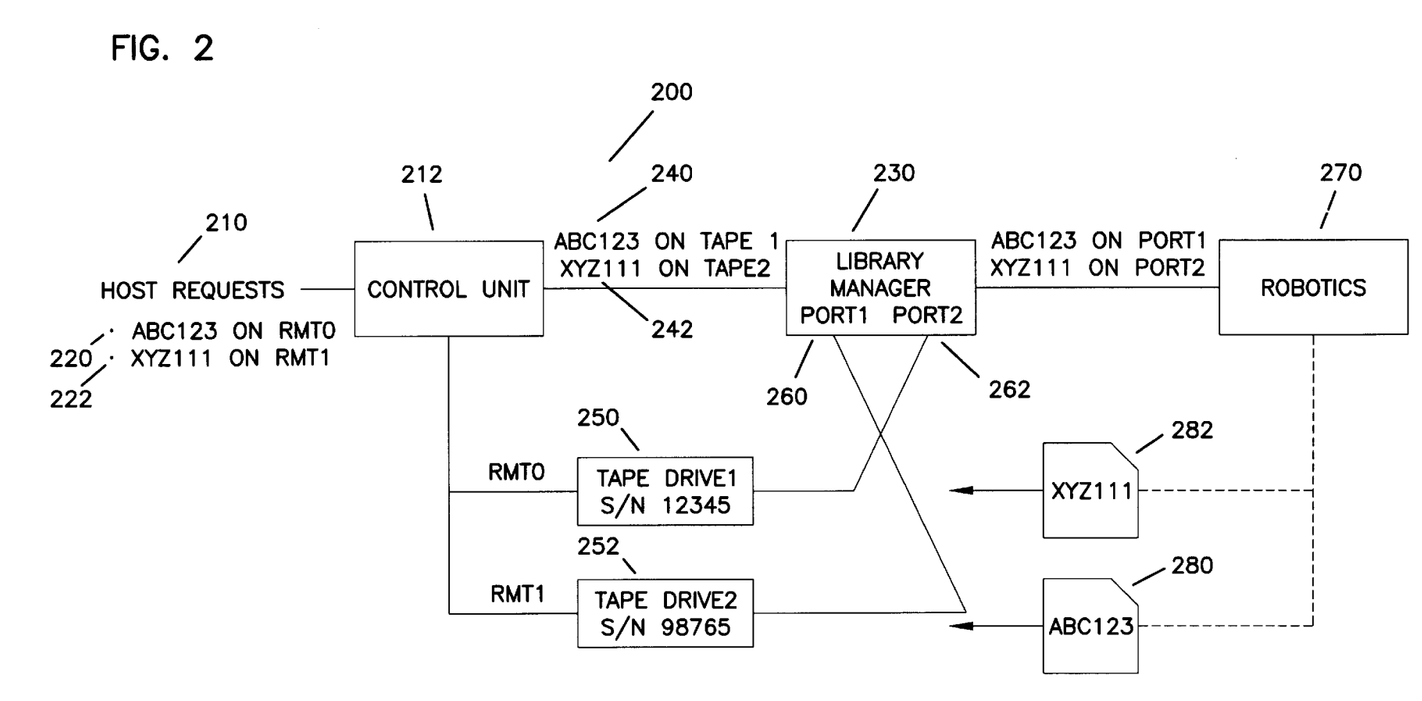
FIG. 2 illustrates an example of a mis-configured system wherein a host may write data on the wrong physical volume.

However, as described above, data may be lost if the tape drives and library managers are configured improperly. FIG. 2 illustrates an example of a mis-configured system 200 wherein a host 210 may write data on the wrong physical volume. In FIG. 2, the host 210 sends requests to a controller 212 in a Removable Media Library (RML), e.g., a virtual tape server system. Those skilled in the art will recognize that reference to host 210 may include a Virtual Tape Server. A Virtual Tape Server is a host to the physical drives in that the host requests volumes to be mounted and writes data on the physical drives.

The requests include a first request 220 to mount a first volume on a first device and a second request 222 to mount a second volume on a second device. The control unit 212 identifies the location of the volumes and instructs the library manager 230 to mount the first volume from a first device using a first external label 240 and to mount the second volume from a second device using a second external label 242.

The controller 212 believes that the first device 250 is configured for the first port 260 of the library manager 230 and that the second device 252 is configured for the second port 262 of the library manager 230. However, the first device 250 is actually configured to the second port 262 of the library manager 230 and the second device 252 is configured to the first port 260 of the library manager 230. The library manager 230 instructs the robotics 270 to mount the first volume 280 on the second device 252, which is configured for the first port 260 of the library manager 230 and to mount the second volume 282 on the first device 250, which is configured for the second port 262 of the library manager 230. The robotics 270 successfully mounts the volumes, but on the wrong devices.

Due to an incorrect configuration, the host 210 thinks the first volume 280 is mounted on the first device 250, but which is actually mounted on the second device 252 and vice versa. The host 210 writes the internal label on each volume, but because of the configuration problem, the first volume 280 now has an internal label indicating that it is volume two and the second volume 282 has an internal label indicating that it is the first volume. Thus, the data written by the host 210 is put onto the wrong volumes.

Subsequently, the volumes are dismounted. Later when the host 210 asks for the first volume to be mounted again, the robotics 270 mounts the volume with external label of one but with an internal label of two. The data intended for the first volume is now lost.

Figure 3:
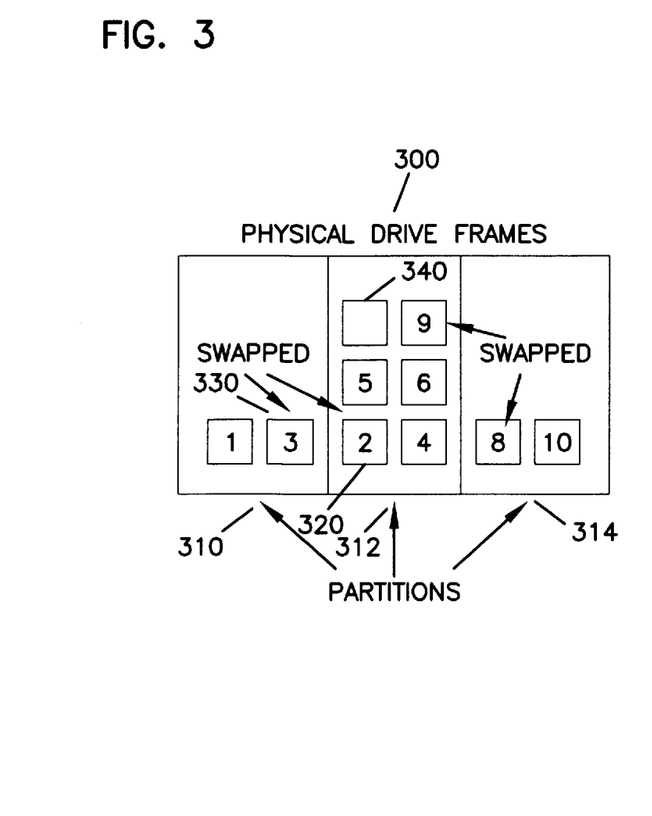
FIG. 3 illustrates a physical library including library partitions according to the present invention.

FIG. 3 illustrates a physical library 300 according to the present invention. The physical library includes partitions 310, 312, 314 with different devices associated in each partition. If the devices and ports on the library manager are mis-configured, e.g., device two 320 and device three 330 are swapped, the mis-configuration cannot be detected when the VTS controller establishes communications with the library manager by exchanging a series of messages without the signaling according to the present invention. Note that device seven 340 is not communicating. As will be described with reference to FIG. 4 below, one of these messages that are exchanged contains the device types and device serial numbers. Further, within a physical library 300 containing a VTS partition, there can also be a non-VTS library partition.

Figure 4:
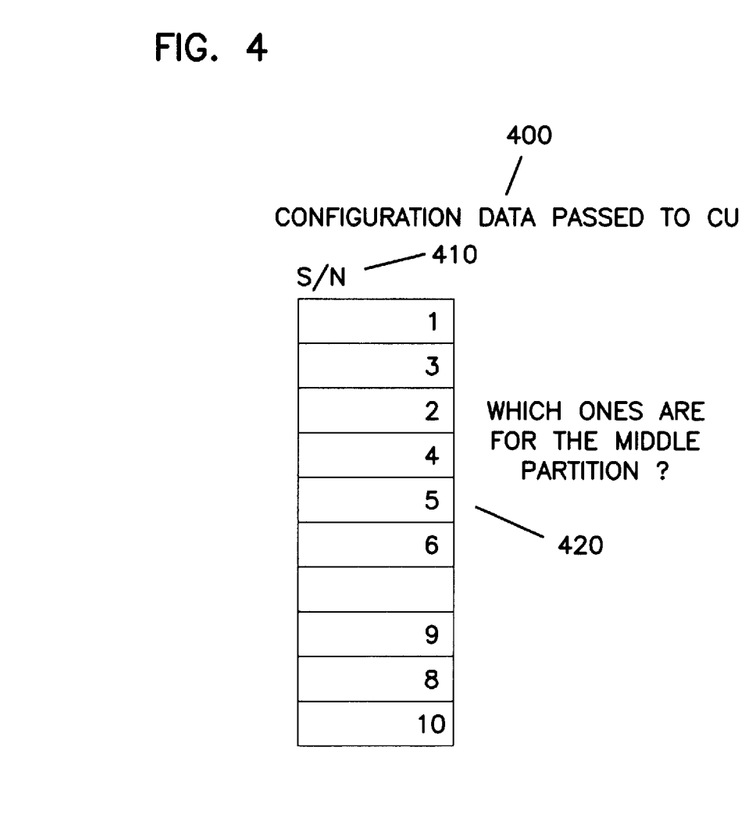
FIG. 4 illustrates the configuration data passed to the control the control unit for the physical drive frames illustrated in FIG. 3.

FIG. 4 illustrates the configuration data 400 in the prior art passed to the control unit for the physical drive 300 illustrated in FIG. 3. In FIG. 4, the configuration data 400 include the serial number 410 and the arrangement of the physical drives by frames 420. According to prior messaging as shown in FIG. 4, the frames are listed in order as seen across the partitions. However, the message does not indicate which devices belong to the which partition, i.e., which devices belong to the VTS library partition and which belong to the non-VTS partition. Rather, all that is provided is a list of devices without knowing the physical association of devices to library partition. Without knowing the physical association of devices to library partition, a conclusive determination of whether the devices are configured correctly cannot be made.

Figure 5:
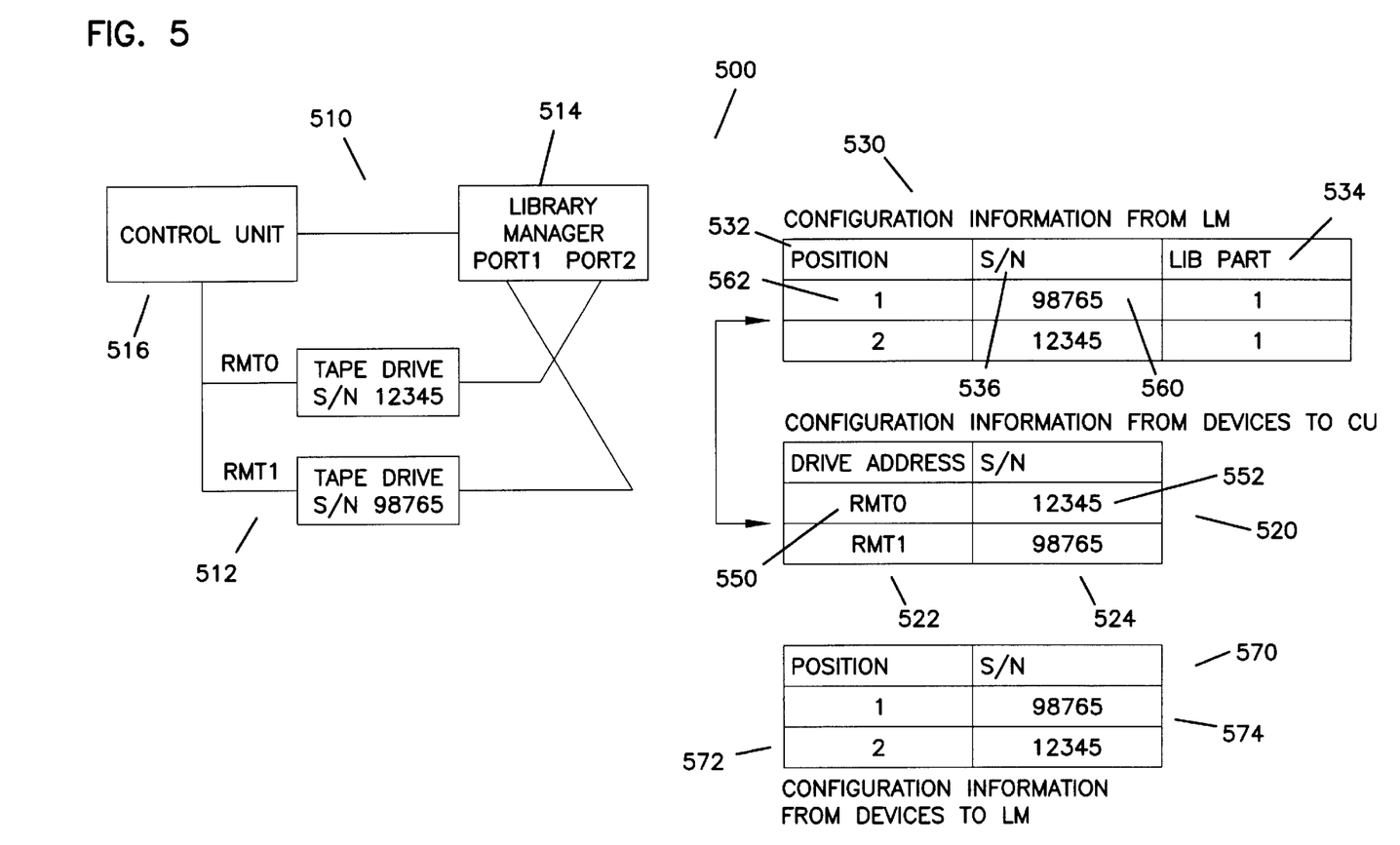
FIG. 5 illustrates configuration records for initialization 500 according to the present invention.

FIG. 5 illustrates configuration records for initialization 500 according to the present invention. FIG. 5 includes a block diagram 510 of the RML for reference with the configuration records. In FIG. 5, the drives 512 send a configuration message 520 to the control unit 516 that includes the device address 522 and a serial number 524 associated with the drive address 522. The drives 512 also send a configuration message 570 to the library manager 514 including position information for the device 572 and a serial number associated with the device 574. The library manager 514 then sends a configuration message 530 to the control unit 516 that includes position information for the device 532, partition association data 534 and a serial number associated with the drive 536. By adding physical position 532, library partition information 534 and associated serial numbers 536 into the configuration records, the RML can determine precisely if its devices are configured correctly. This allows it to block the use of mis-configured devices and to provide feedback to service personal of which devices are mis-configured.

In FIG. 5, it is clear that the control unit believes that drive address RMT0 550 is connected to the first position. However, the serial number 560 for the first position 562 does not match the serial number 552 for the first drive address 550. Thus, the control unit 516 can determine conclusively that the drives 512 are not connected to the library manager 514 correctly.

Figure 6:
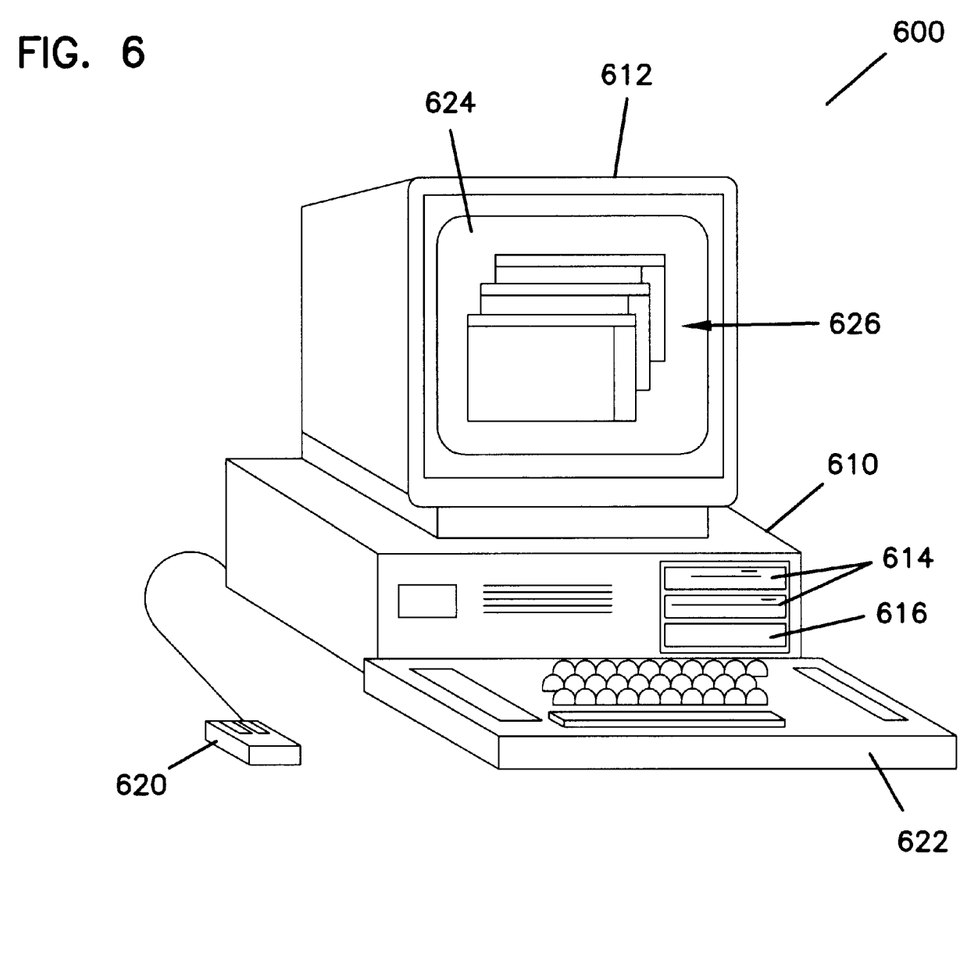
FIG. 6 is a block diagram that illustrates an exemplary hardware environment for performing the method for configuring a removable media library system to prevent data loss according to the present invention.

FIG. 6 is a block diagram 600 that illustrates an exemplary hardware environment for performing the method for configuring a removable media library system to prevent data loss according to the present invention. The present invention is typically implemented using a computer 610 comprised of a microprocessor, random access memory (RAM), read-only memory (ROM), and other components. It is envisioned that attached to the computer 610 may be a monitor 612, floppy disk drives 614, and CD-ROM drives 616. Also included in the preferred embodiment may be input devices, for example, a mouse pointing device 620 and a keyboard 622.

The computer 610 operates under the control of an operating system 624, such as the Windows, OS/2, Macintosh, or UNIX operating systems, which is represented in FIG. 6 by the screen display on the monitor 612. The computer 610 executes one or more computer programs 626, which are represented in FIG. 6 by the "windows" displayed on the monitor 612, under the control of the operating system 624. The present invention comprises a storage manager that is preferably implemented in the operating system 624 and/or computer programs 626.

Generally, the operating system 624 and the computer programs 626 may be tangibly embodied in a computer-readable medium or carrier, e.g. one or more of the fixed and/or removable data storage devices 614 and 616, or other data storage or data communications devices. Both the operating system 624 and the computer programs 626 may be loaded from the data storage devices 614 and 616 into the random access memory of the computer 610 for execution by the microprocessor as discussed above with reference to FIG. 6. Both the operating system 624 and the computer programs 626 comprise instructions which, when read and executed by the microprocessor of the computer 610, causes the computer 610 to perform the steps necessary to execute the steps or elements of the present invention.

Although an exemplary computer system configuration is illustrated in FIG. 6, those skilled in the art will recognize that any number of different configurations performing similar functions may be used in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of configuring a removable media library system, wherein data loss is prevented, comprising the steps of:

sending a first configuration message to a library manager from a drive, the first configuration message comprising a drive address and a serial number associated with the drive address;

forwarding to a control unit from a library manager a second configuration message, the second configuration message comprising position information for the drive and a serial number associated with the drive;

forwarding to the control unit from the drive a third configuration message, the third configuration message comprising position information for the drive and a serial number associated with the drive; and comparing at the control unit the second and third configuration messages to determine whether the drive and the library manager are configured correctly.

2. The method of claim 1 wherein the first configuration message further comprises a plurality of drive addresses and a serial number associated with each of the plurality of drive addresses, the second configuration message further comprises position information for a plurality of drives and a serial number associated with each of the plurality of drives, and the third configuration message further comprises position information for a plurality of drives and a serial number associated with each of the plurality of drives.

3. The method of claim 2 wherein the step of comparing the second and third configuration messages to determine whether the drive and the library manager are configured correctly further comprises the step of comparing the serial number of each of the drive addresses in the second configuration message with the serial number associated with corresponding positions in the third configuration message.

4. The method of claim 1 wherein the step of comparing the second and third configuration messages to determine whether the drive and the library manager are configured correctly further comprises the step of comparing the serial number of the second configuration message with the serial number associated with a corresponding position in the third configuration message.

5. The method of claim 1 wherein the second and third configuration messages further comprise partition information associated with the drive.

6. A removable media library system, comprising:
   a control unit for receiving requests from a host to access a physical volume;
   a device for reading and writing on the physical volumes; and
   a library manager, coupled to the control unit and the device for reading and writing on the physical volumes;
   wherein the device sends a first configuration message to the library manager and the library manager sends a second configuration message to the control unit, the first configuration message comprising the device address and a serial number associated with the device address and the second configuration message comprising position information for the device and a serial number associated with the device, the device sends a third configuration message to the control unit, the third configuration message comprising position information for the device and a serial number associated with the device, and wherein the control unit compares the second and third configuration messages to determine whether the device and the library manager are configured correctly.

7. The removable media library system of claim 6 wherein the first configuration message further comprises a plurality of device addresses and a serial number associated with each of the plurality of device address, the second configuration message further comprises position information for a plurality of devices and a serial number associated with each of the plurality of devices, and the third configuration message further comprises position information for a plurality of devices and a serial number associated with each of the plurality of devices.

8. The removable media library system of claim 7 wherein the control unit compares the serial number of each of the device addresses in the second configuration message with the serial number associated with corresponding positions in the third configuration message.

9. The removable media library system of claim 8 wherein the control unit compares the serial number of the second configuration message with the serial number associated with a corresponding position in the third configuration message.

10. The removable media library system of claim 9 wherein the second and third configuration messages further comprise partition information associated with the device.

11. An article of manufacture for a computer-based user-interface, the article of manufacture comprising a computer readable medium having instructions for causing a computer to perform a method comprising the steps of:
   sending a first configuration message to a library manager from a drive, the first configuration message comprising a drive address and a serial number associated with the drive address;
   forwarding to a control unit from a library manager a second configuration message, the second configuration message comprising position information for the drive and a serial number associated with the drive;
   forwarding to the control unit from the drive a third configuration message, the third configuration message comprising position information for the drive and a serial number associated with the drive; and
   comparing at the control unit the second and third configuration messages to determine whether the drive and the library manager are configured correctly.

12. The article of manufacture of claim 11 wherein the first configuration message further comprises a plurality of drive addresses and a serial number associated with each of the plurality of drive addresses, the second configuration message further comprises position information for a plurality of drives and a serial number associated with each of the plurality of drives, and the third configuration message further comprises position information for a plurality of drives and a serial number associated with each of the plurality of drives.

13. The article of manufacture of claim 12 wherein the step of comparing the second and third configuration messages to determine whether the drive and the library manager are configured correctly further comprises the step of comparing the serial number of each of the drive addresses in the second configuration message with the serial number associated with corresponding positions in the third configuration message.

14. The article of manufacture of claim 11 wherein the step of comparing the second and third configuration messages to determine whether the drive and the library manager are configured correctly further comprises the step of comparing the serial number of the second configuration message with the serial number associated with a corresponding position in the third configuration message.

15. The article of manufacture of claim 11 wherein the second and third configuration messages further comprise partition information associated with the drive.

16. A virtual tape server, comprising:
   a primary storage system for storing intensively used and frequently accessed data, the data being transferred to the primary storage system as logical volumes;
   a secondary storage system, coupled to the primary storage system, for storing less frequently accessed logical volumes and forming an automated library;

a control unit for receiving requests from a host to access a physical volume in the secondary storage system;

a device, disposed within the secondary storage system, for reading and writing on the physical volumes; and a library manager, coupled to the control unit and the device, for reading and writing on the physical volumes;

wherein the device sends a first configuration message to the library manager and the library manager sends a second configuration message to the control unit, the first configuration message comprising the device address and a serial number associated with the device address and the second configuration message comprising position information for the device and a serial number associated with the device, the device sends a third configuration message to the control unit, the third configuration message comprising position information for the device and a serial number associated with the device, and wherein the control unit compares the second and third configuration messages to determine whether the device and the library manager are configured correctly.

17. The virtual tape server of claim 16 wherein the first configuration message further comprises a plurality of device addresses and a serial number associated with each of the plurality of device addresses the second configuration message further comprises position information for a plurality of devices and a serial number associated with each of the plurality of devices, and the third configuration message further comprises position information for a plurality of devices and a serial number associated with each of the plurality of devices.

18. The virtual tape server of claim 17 wherein the control unit compares the serial number of each of the device addresses in the second configuration message with the serial number associated with corresponding positions in the third configuration message.

19. The virtual tape server of claim 18 wherein the control unit compares the serial number of the second configuration message with the serial number associated with a corresponding position in the third configuration message.

20. The virtual tape server of claim 17 wherein the second and third configuration messages further comprise partition information associated with the device.

* * * * *

UNITED STATES PATENT AND TRADEMARK OFFICE
CERTIFICATE OF CORRECTION

PATENT NO.     : 6,226,711 B1                                               Page 1 of 1
DATED          : May 1, 2001
INVENTOR(S)    : Fisher et al.

It is certified that error appears in the above-identified patent and that said Letters Patent is hereby corrected as shown below:

Column 1,
Line 39, replace "visa" with -- vice --;

Column 3,
Line 49, delete "the control";

Column 8,
Line 11, replace "claim 9" with -- claim 6 --.

Signed and Sealed this

First Day of October, 2002

*Attest:*

*Attesting Officer*

JAMES E. ROGAN
*Director of the United States Patent and Trademark Office*